United States Patent [19]

Goldberg et al.

[11] Patent Number: 5,186,515
[45] Date of Patent: * Feb. 16, 1993

[54] LOW FRICTION GRIPPER

[75] Inventors: Kenneth Y. Goldberg, Bethlehem; Merrick L. Furst, Pittsburgh, both of Pa.

[73] Assignee: Carnegie Mellon University, Pittsburgh, Pa.

[*] Notice: The portion of the term of this patent subsequent to Mar. 24, 2009 has been disclaimed.

[21] Appl. No.: 799,080

[22] Filed: Nov. 27, 1991

Related U.S. Application Data

[63] Continuation of Ser. No. 617,915, Nov. 21, 1990, Pat. No. 5,098,145, which is a continuation of Ser. No. 384,941, Jul. 25, 1989, abandoned.

[51] Int. Cl.⁵ .............. B66C 1/42; B25B 1/24; B25B 5/16
[52] U.S. Cl. .................. 294/119.1; 269/264; 269/277
[58] Field of Search .......... 294/119.1, 102.1, 902; 901/31, 39; 269/164, 219, 220, 259, 264, 275, 277; 24/136 R

[56] References Cited

U.S. PATENT DOCUMENTS

| | | | |
|---|---|---|---|
| 214,403 | 4/1879 | Lane | 269/220 |
| 663,343 | 12/1900 | Harris | 269/219 |
| 875,121 | 12/1907 | Shryock | 24/136 R |
| 1,048,928 | 12/1912 | Aster et al. | 294/102.1 X |
| 2,384,636 | 9/1945 | Nelson | 294/119.1 X |
| 3,020,041 | 2/1962 | Peterson et al. | 269/275 X |
| 3,248,121 | 4/1966 | Volpe | 269/275 |
| 4,240,621 | 12/1980 | Daddato | 269/264 |

Primary Examiner—Charles A. Marmor
Assistant Examiner—Dean J. Kramer
Attorney, Agent, or Firm—Ansel M. Schwartz

[57] ABSTRACT

An apparatus for gripping objects comprising a first jaw having a first support member and a first support plate that is slidingly attached to the support member with respect to a first direction or motion. The apparatus is also comprised of a second jaw that has a second support member and a second surface plate attached to the second surface member. Additionally, the apparatus is comprised of a structure holding the first jaw and the second jaw such that the first jaw and the second jaw can move in a second direction toward or away from each other to grip or release the object, respectively. In a preferred embodiment, the second surface plate is fixedly attached to the second support member and the first direction is perpendicular to the second direction. The sliding action of the first support plate acts to reduce the effective frictional force between the object and jaws to facilitate stable grasping.

1 Claim, 2 Drawing Sheets

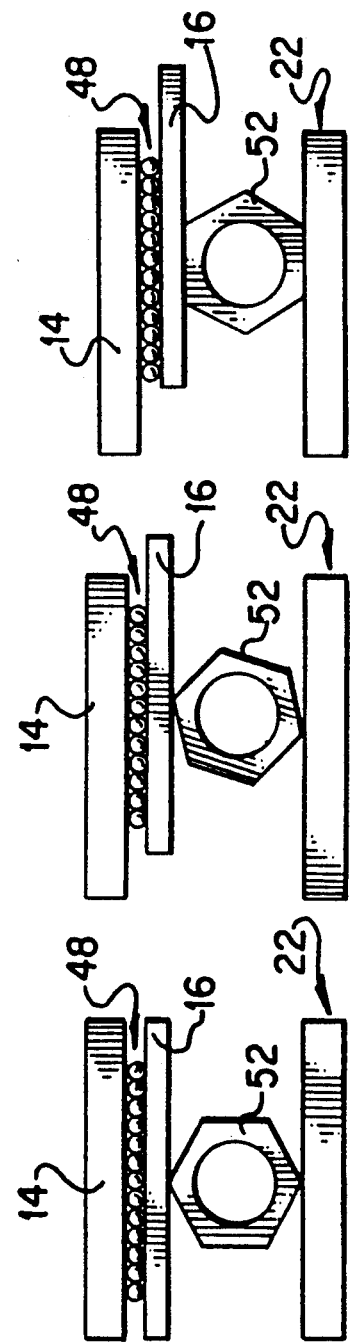

LOW FRICTION GRIPPER

The present invention is a continuation of U.S. Pat. application Ser. No. 07/617,915 filed Nov. 21, 1990, now U.S. Pat. No. 5,098,145 issued Mar. 24, 1992, which is a continuation of U.S. Pat. application Ser. No. 07/384,941 filed July 25, 1989, abandoned.

FIELD OF THE INVENTION

The present invention is related to an apparatus for gripping objects. More specifically, the present invention relates to an apparatus which has a first jaw and a second jaw, with at least the first jaw having a slidingly attached surface plate.

BACKGROUND OF THE INVENTION

Grippers are widely used to grasp and transport objects, for example in robotics, teleoperation (master-slave control), and prosthetic devices. It is desirable to provide a gripper that will facilitate stable grasping.

One way to measure the stability of a grasp configuration is by the number of contacts between the object and the gripping jaws. Grasp configurations with exactly 2 edge contacts are referred to as wedged and grasp configurations with 3 or more edge contacts are referred to as stable. For example, consider grasping a hex nut with a parallel-jaw gripper. The hex nut is in a wedged configuration when it is cocked along two opposite edges (FIG. 4) and in a stable configuration when it is gripped along two opposite faces (FIG. 6). Stable grasp configurations are generally preferred because the object is less likely to slip out of the gripper when transported or inserted.

If there is low friction between the object and the gripping jaws, the object will tend to rotate into a stable grasp configuration as the jaws are closed. At the same time, it is required that there exists high friction between the object and the gripping jaws to counter the effect of gravity as the object is lifted and carried. Therefore, it is desired to have low friction along one direction and high friction along a second direction.

SUMMARY OF THE INVENTION

The present invention pertains to an apparatus for gripping objects. The apparatus comprises a first jaw having a first support member and a first support plate that is slidingly attached to the support member with respect to a first direction of motion. The apparatus is also comprised of a second jaw that has a second support member and a second surface plate attached to the second surface member. Additionally, the apparatus is comprised of a structure holding the first jaw and the second jaw such that the first jaw and the second jaw can move in a second direction toward or away from each other to grip or release the object, respectively. In a preferred embodiment, the second surface plate is fixedly attached to the second support member.

BRIEF DESCRIPTION OF THE DRAWINGS

In the accompanying drawings, the preferred embodiments of the invention and preferred methods of practicing the invention are illustrated in which:

FIG. 3 is a cross-sectional end view of a portion of the apparatus.

FIG. 4 is a schematic representation of a hex nut in a wedged condition with respect to the apparatus.

FIG. 5 is a schematic representation of the hex nut in a transitional position with respect to the apparatus.

FIG. 6 is a schematic representation of the hex nut in a stable position with respect to the apparatus.

DESCRIPTION OF THE PREFERRED EMBODIMENT

Figure 1:
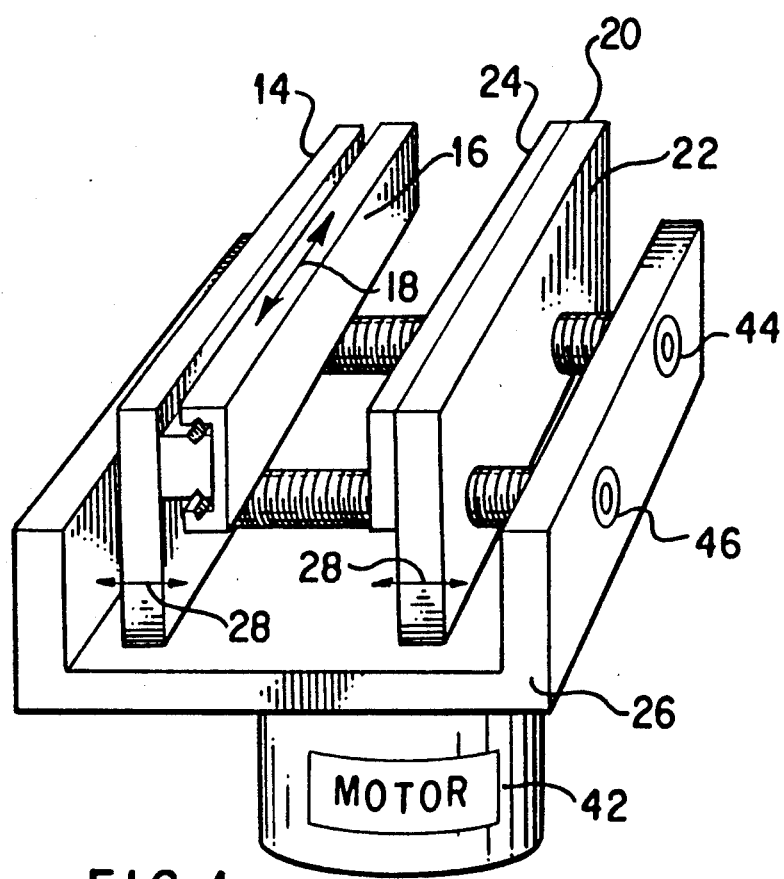
FIG. 1 is a schematic representation of the apparatus.

Referring now to the drawings wherein like reference numerals refer to similar or identical parts throughout the several views, and more specifically to FIG. 1 thereof, there is shown a perspective view of an apparatus 10 for gripping objects. Preferably, the objects are polyhedral. The apparatus 10 comprises a first jaw 12 having a first support member 14 and a first surface plate 16 that is slidingly attached to the support member 14 with respect to a first direction of motion 18. The apparatus 10 is also comprised of a second jaw 20 that has a second support member 22 and a second surface plate 24 attached to the second surface member 22. The second surface plate 24 is preferably fixedly attached to the second support member 22. Preferably, the first surface plate 16 and second surface plate 24 are essentially parallel and flat.

Additionally, the apparatus 10 includes a structure 26 holding the first jaw 12 and the second jaw 20 such that the first jaw 12 and the second jaw 20 can move in a second direction 28 toward or away from each other to grip or release the object, respectively. Preferably, the first direction 18 is essentially perpendicular to the second direction 28.

Figure 2:
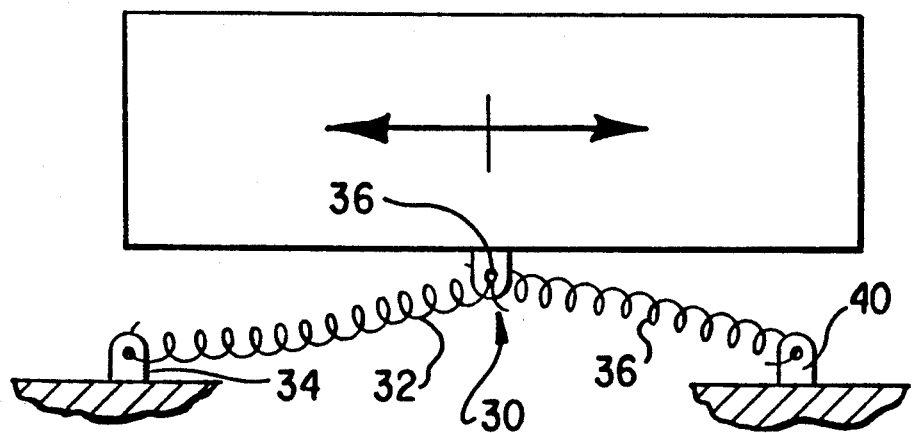
FIG. 2 is a cross-sectional side view of a portion of the apparatus.

The apparatus 10 also can include means for restoring the first surface plate 16 to an equilibrium position after it has slidingly moved relative to the first support member 14. The restoring means preferably includes a spring 30 attached to the first surface plate 16 such that after the first surface plate 16 has slidingly moved relative to the first support member 14, the spring 30 causes it to return to its equilibrium position as shown in FIG. 2. The spring 30 can, for instance, have a first portion 32 which is connected at one end to a first lug 34 fixedly attached to the structure 26 and whose other end is connected to a second lug 36 that is preferably connected to the first surface plate 16 at essentially its center. The spring 30 also has a second portion 38 that has one end connected to a third lug 40 which is fixedly attached to the structure 26, and whose other end is connected to the second lug 36. Whenever the first surface plate 16 moves towards, for instance, the first lug 34, a restraining force is applied to it by the second portion 38 of the spring 30 connected to the third lug 40. A similar force is applied when the first surface plate 16 moves towards the third lug 40, except the first portion 32 provides the restraining force. The restraining force is negligible during grasping, but acts to restore the first surface plate 16 to an equilibrium position after the object is released.

The apparatus 10 can also include means for moving the first jaw 12 and the second jaw 20 such that the first and second jaws can move toward each other and grip the object or move away from each other and release the object. The moving means can be, for instance, a motor 42 disposed in the structure 26 which is connected to a first worm gear 44 and a second worm gear 46. The first worm gear 44 and second worm gear 46 are threaded through the first support member 14 and second support member 22 such that depending on the direction the worm gears turn determines whether the first jaw 12 and second jaw 20 move toward or away from each other.

The apparatus 10 preferably also includes a linear bearing 48, for instance, comprised of balls 50 as shown in FIG. 3. The linear bearing 48 serves to minimize the friction between the first surface plate 16 and first support member 14. The linear bearing 48 is disposed between and in contact with the first surface plate 16 and first support member 14 on which the first surface plate 16 slides relative to the first support member 14.

In the operation of the invention, the motor 42 causes the first worm gear 44 and second worm gear 46 to rotate such that the first jaw 12 and second jaw 20 move toward each other to grasp the hex nut 54 as shown in FIG. 4. If the hex nut 54 becomes wedged, as is the case in FIG. 4, the initial grasp by the apparatus 10 of the hex nut 54 is unstable. Since the grasp is unstable, the fact that the first surface plate 16 is slidingly attached to the first support member 14 through the linear bearing 48 results in the first surface plate 16 slipping for instance, to the left relative to the first support member 14. Once the hex nut is out of its wedged condition, the first surface plate 16 continues to slide along the linear bearing 48 causing the hex nut 52 to continue to move, as shown in FIG. 5, until the hex nut 52 reaches a stable position as shown in FIG. 6.

At the point the hex nut 52 is in a stable position relative to the first jaw 12 and second jaw 20, the perpendicular force from the first jaw 12 and second jaw 20 relative to the surface of the first surface plate 16 causes the hex nut to be maintained in place with respect to the first surface plate 16 and first support member 14. It is also this perpendicular force which causes the hex nut to move into its stable position once it has moved out of its wedged or unstable position. Horizontal forces relative to the first surface plate 16, such as vibrational forces, that are typically experienced during the normal operation of such grippers are usually great enough to cause the hex nut to move out of its wedged position when a first surface plate 16 is slidingly attached to the first support member 14. Once the apparatus 10 releases the hex nut 52 by the jaws retreating from each other under the action of the motor, the perpendicular force from the first jaw 12 and second jaw 20 holding the hex nut 52 in position is removed. The first portion 32 of the spring 30 then causes the first surface plate 16 to return to its equilibrium position so the apparatus 10 is ready to obtain another hex nut 52.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. An apparatus for gripping objects having at least one edge comprising:

a first jaw having a first support member with a surface, and a first surface plate that is in he shape of a rectangle with a flat face and which is slidably connected to the first support member such that the first surface plate is able only to translate in a direction parallel with the surface of the first support member but not able to rotate;

a second jaw that has a second support member and a second surface plate that is in he shape of a rectangle with a flat face and which is fixedly attached to the second support member, said flat face of the second surface plate is essentially parallel to said flat face of the first surface plate and a structure holding the first jaw and the second jaw such that the first jaw and the second jaw can move in a direction toward each other to grip the object with the respective faces by causing the object to rotate into a stable configuration from only the force created by the fist and second jaws moving toward each other, or away from each other to release the object, said direction perpendicular with the surface of the first support member.

* * * * *